(12) United States Patent
Huang

(10) Patent No.: US 7,304,806 B2
(45) Date of Patent: Dec. 4, 2007

(54) LENS RETRACTION MECHANISM AND METHOD OF THE SAME

(75) Inventor: Chun-Hung Huang, Changhwa (TW)

(73) Assignee: Asia Optical Co., Ltd., Taichung (TW)

( * ) Notice: Subject to any disclaimer, the term of this patent is extended or adjusted under 35 U.S.C. 154(b) by 0 days.

(21) Appl. No.: 11/465,415

(22) Filed: Aug. 17, 2006

(65) Prior Publication Data

US 2007/0041103 A1   Feb. 22, 2007

(30) Foreign Application Priority Data

Aug. 18, 2005   (TW) .............................. 94128251 A

(51) Int. Cl.
*G02B 15/14* (2006.01)
*G02B 7/02* (2006.01)
*G03B 17/00* (2006.01)
*G03B 17/04* (2006.01)

(52) U.S. Cl. ....................... 359/694; 359/699; 359/701; 359/813; 359/823; 396/72; 396/73; 396/85; 396/349

(58) Field of Classification Search ........ 359/694–701, 359/813, 819, 822–824, 830; 396/72, 73, 396/75, 79, 85, 89, 349, 439
See application file for complete search history.

(56) References Cited

U.S. PATENT DOCUMENTS

| 6,312,168 | B1 * | 11/2001 | Naruse et al. | 396/349 |
|---|---|---|---|---|
| 6,978,088 | B2 * | 12/2005 | Nomura | 396/73 |
| 7,013,081 | B2 * | 3/2006 | Nomura et al. | 396/73 |
| 7,068,929 | B2 * | 6/2006 | Nomura | 396/73 |

* cited by examiner

*Primary Examiner*—Loha Ben

(57) ABSTRACT

A lens retraction mechanism slantways retracts a lens from a shooting position to a receiving space. The lens retraction mechanism includes a base body, which includes a substrate, a guide wall disposed on the substrate and the receiving space, a lens guiding frame moveable with respect to the base body in the direction of an optical axis of the lens group, a pair of guiding shafts having one end fixed to the guiding frame, and a lens holding frame that fixes a lens group and includes a pair of slippage portions moveable with respect to the guide wall. When the lens retracts, the guiding frame draws the guiding shaft to move towards the substrate in the direction of the optical axis, and the lens holding frame moves along the guide means and also along the guiding shaft, and finally falls into the receiving space. The lens retraction mechanism retracts the lens group stably and securely.

23 Claims, 7 Drawing Sheets

LENS RETRACTION MECHANISM AND METHOD OF THE SAME

BACKGROUND OF THE INVENTION

1. Field of the Invention

The present invention relates generally to a zoom lens which is used with a camera or a digital video camera, and more particularly to a lens retraction mechanism of the zoom lens and the retracting method of the same.

2. Description of the Prior Art

In recent years, most photographic devices, such as digital cameras or digital video cameras, are equipped with zoom lenses. Users can photograph objects in different distances with one device by extending or retracting the zoom lens to adjust the lens focus. In shooting a distant object, the photographic device must have the lens extended by a zoom multiple. The larger the zoom multiple is, the longer the extended lens is. Users usually do not care about how long the lens can be extended in taking photographs, but they are more concerned about the overall weight and size of the photographic device when the lens of the device is retracted to a nonuse state.

FIG. 1 of the attached drawings shows a conventional lens retraction mechanism of a zoom lens. The conventional zoom lens comprises a lens barrel 9 and first, second and third lens groups 91, 92, 93 received in the lens barrel 9. The lens groups 91, 92, 93 are sequentially and respectively received in a receiving space along an optical axis Z0. In the conventional retraction arrangement, the lens thickness inevitably exceeds the sum of the thickness of all lens groups 91, 92, 93. Accordingly, the overall thickness of the photographic device is not satisfactory for general consumers.

In order to reduce the lens thickness, methods have been employed to retract the lens groups by deviating the lens away from the optical axis of the photographic device and retraction mechanisms working in this way are available in the market. An example is Ricoh Caplio R1 digital camera, in which when the lens begins to retract, a front lens group of the lens is drawn back along an optical axis of the lens, while a rear lens group of the lens is moved away from the optical axis, and finally positioned in either side space of the optical axis, to leave a space for accommodating backward moved front lens group. This arrangement allows the multiple lens groups to be stowed without stacking over each, and instead sideways positioned side by side, so as to reduce the overall thickness of the lens in a stowed condition.

Another example of lens retraction by sideways deviating lens from the optical axis is Pentax Optio S50 digital camera. When power supply is shut off, the lens is sequentially drawn back into the camera body, while a central lens group is moved upward, in a direction transverse to an optical axis of the lens, so as to leave a space for front and rear lens groups which are moved along the optical axis.

Such retraction structures and methods can also refer to the Japanese Patent Application Nos. 2004-317943, 2004-361657, 2004-361921, and US Patent Application Serial No. 20040228626.

The US Patent Application discloses a lens retraction mechanism for driving a lens barrel to move between an advanced state and a retracted state. The lens barrel comprises a front lens group, a rear lens group, and a focusing lens group. When the lens barrel is moved from the advanced state to the retracted state, the lens retraction mechanism moves at least one lens group sideways away from an optical axis to a receiving space sideways deviating from the optical axis; and when the lens barrel is moved from the retracted state to the advanced state, the lens retraction mechanism moves the sideways-deviated lens group back to the optical axis. The lens retraction mechanism comprises a stepping motor, and when the lens barrel starts to retract, a driving gear coupled to the stepping motor rotates at a predetermined timing and with this, a transmitting gear fixed to a rear lens group holding frame is forced to rotate and fiber transmitting its rotation force to a receiving gear. Therefore, the rear lens group is retracted with the rotation and retraction of the rear lens group holding frame, from the optical axis to the retracted state which is deviated from the optical axis. However, this known lens retraction mechanism has a complicated structure because it uses a lot of gears, which need to precisely mate each other and rotate synchronously. If one gear goes wrong, the whole lens retraction mechanism fails to work. Furthermore, in the retraction of the rear lens group, the rear lens group holding frame retracts by way of rotation, which increases the movement path of the rear lens group from the advanced state to the retracted state, thereby costing a lot of retraction time of the rear lens group.

Hence, an improved lens retraction mechanism and method for the mechanism are desired to overcome the above-mentioned disadvantages of the prior art.

SUMMARY OF THE INVENTION

Therefore, an object of the present invention is to provide a lens retraction mechanism which has a simple structure and reduced retraction time.

Another object of the present invention is to provide a lens retraction method for retracting a zoom lens from a shooting state to a non-use state steadily in a short period of time.

In order to achieve the objects and overcome the above-identified deficiencies in the prior art, a lens retraction mechanism in accordance with the present invention which retracts a zoom lens from a shooting position to a receiving space by slantways retracting comprises a base body having a substrate, a guide wall disposed on the substrate and the receiving space, a lens guiding frame moveable with respect to the base body, a pair of guiding shafts fixed to the guiding frame, and a lens holding frame that fixes a lens group and includes a pair of slippage portions moveable with respect to the guide wall. When the lens retracts, the guiding frame draws the guiding shaft to towards the substrate in the direction of the optical axis, and the lens holding frame moves along the guide means and also along the guiding shaft, and finally enters the receiving space. The lens retraction mechanism retracts the lens group stably and securely.

In order to achieve the objects of the present invention, a method for retracting a lens group by a lens retraction mechanism comprises: moving the lens guiding frame towards the base body along an optical axis of the lens group; and moving the lens holding frame towards the base body and away from the optical axis along a guiding track provided by the guiding device with driving of the lens guiding frame.

Other objects, advantages and novel features of the invention will become more apparent from the following detailed descriptions of preferred embodiments when taken in conjunction with the accompanying drawings.

BRIEF DESCRIPTION OF THE DRAWINGS

The present invention may be best understood through the following description with reference to the accompanying drawings, in which.

DETAILED DESCRIPTION OF THE PREFERRED EMBODIMENT

References will now be made in details to a preferred embodiment of the present invention.

Figure 1:
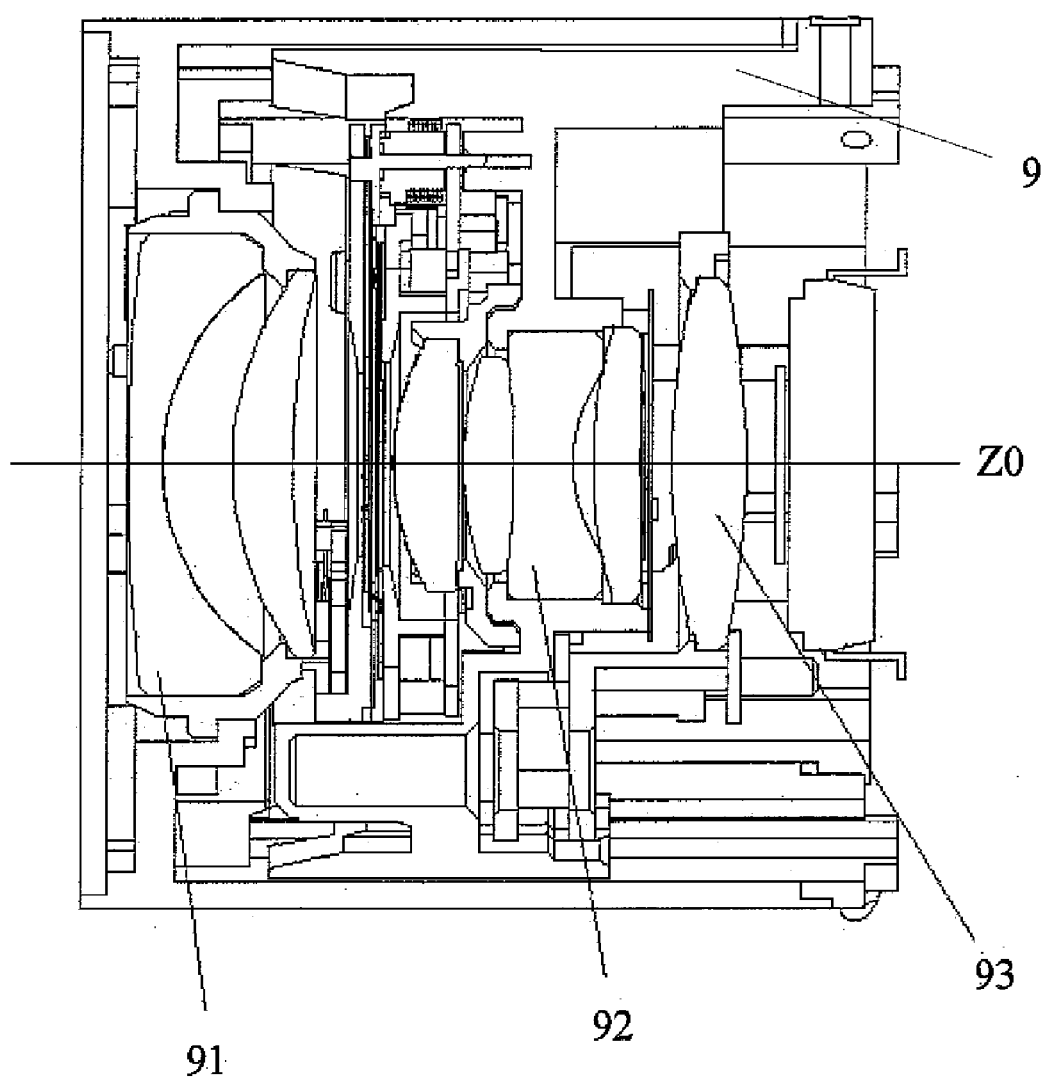
FIG. 1 is a cross-sectional schematic view showing a received state of a conventional zoom lens.
Figure 2:
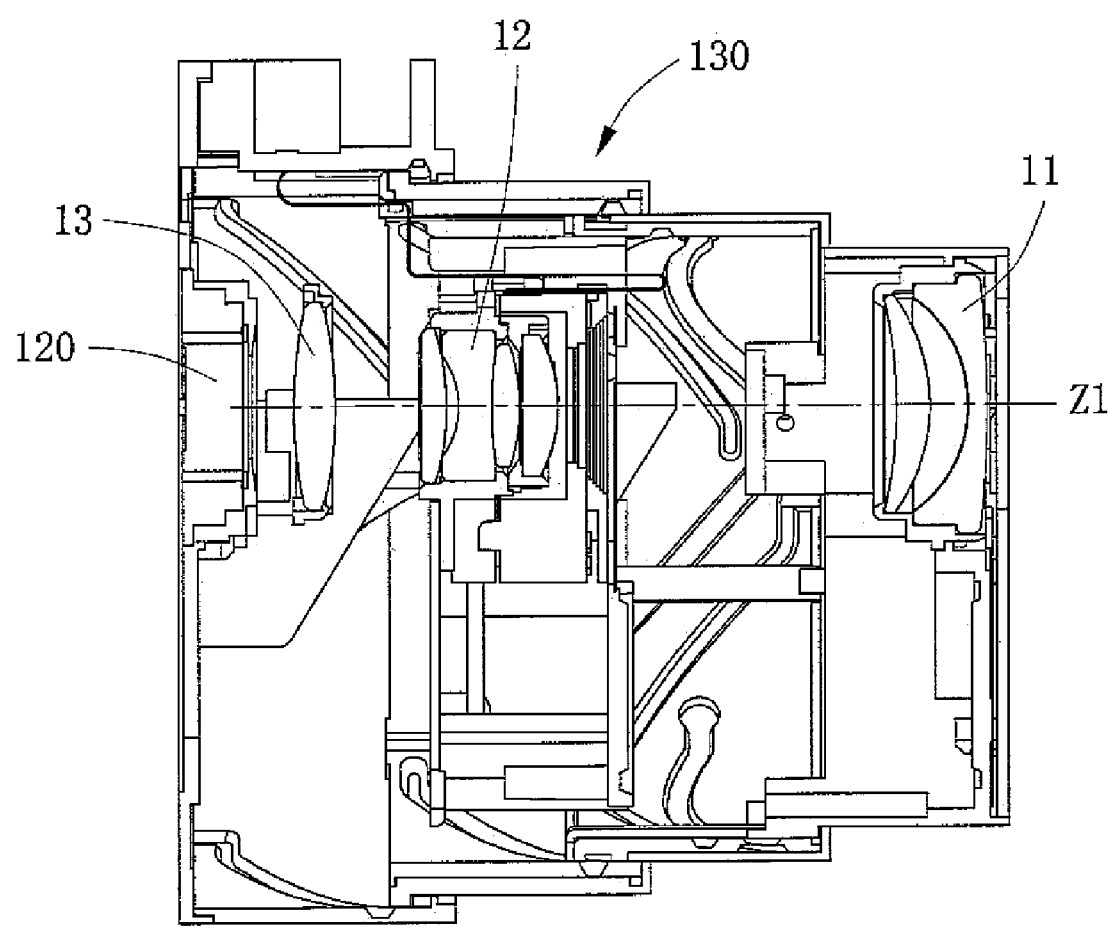
FIG. 2 is a cross-sectional schematic view of a zoom lens in accordance with the present invention in a use state.
Figure 3:
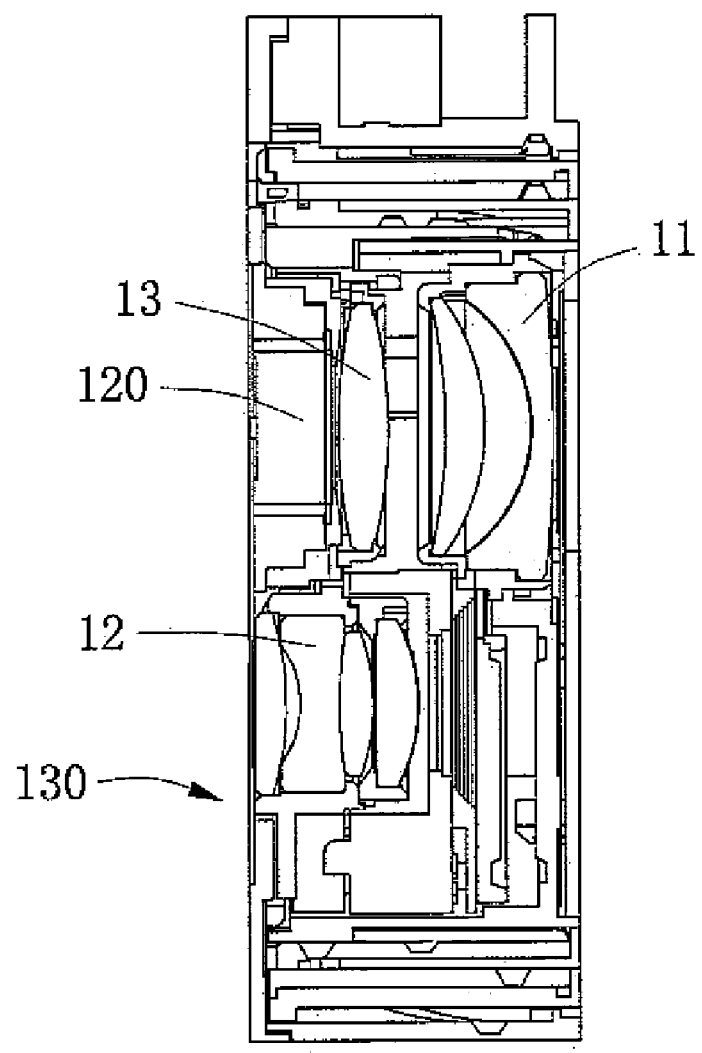
FIG. 3 is a cross-sectional schematic view of the zoom lens in accordance with the present invention in a received state.

A lens retraction mechanism in accordance with the present invention is used in an optical photographic device that has a zoom lens, such as a digital camera and a digital video camera. When the optical photographic device is powered on, the zoom lens is extended from a received state to a general shooting state. In the general shooting state, a focal length of the zoom lens can be adjusted by advancing the zoom lens to a tele-edge state having the longest focal length or retracting the zoom lens to a wide-edge state having the shortest focal length. In the following description, the general shooting state, the tele-edge state and the wide-edge state are all defined as a use state in which the camera can take a photo or obtain a video. Accordingly, the lens retraction mechanism in accordance with the present invention is provided for retracting the zoom lens from the shooting state to the received state. FIG. 2 is a cross-sectional view showing the use state of the zoom lens, generally designated with reference numeral 10, according to the present invention. FIG. 3 is a cross-sectional view showing the received state of the zoom lens 10.

Referring to FIG. 2, the zoom lens 10 comprises an optical system and a mechanical system for receiving, fixing, connecting or guiding the optical system. The optical system comprises an image component 120 (such as a CCD) arranged on the shooting axis Z1, and a first lens group 11, a second lens group 12, and a third lens group 13 sequentially arranged along the shooting axis Z1 whose distances from the image component 120 are increased gradually. When the zoom lens 10 flexes among the general shooting state, the tele-edge state and wide-edge state, the second lens group 12 adjusts focal length of the zoom lens 10, and the third lens group 13 sets the focus of the zoom lens 10. In an embodiment of the present invention, when the optical photographic device is turned off, the first lens group 11 and the third lens group 13 are retracted in the direction of the shooting axis Z1, and the retraction of the lens groups 11, 13 is known in the art and constitutes no novel parts of the present invention. The second lens group 12 is retracted in the direction deviating from the shooting axis Z1, whose retraction mechanism will be detailedly described in the following.

Figure 4:
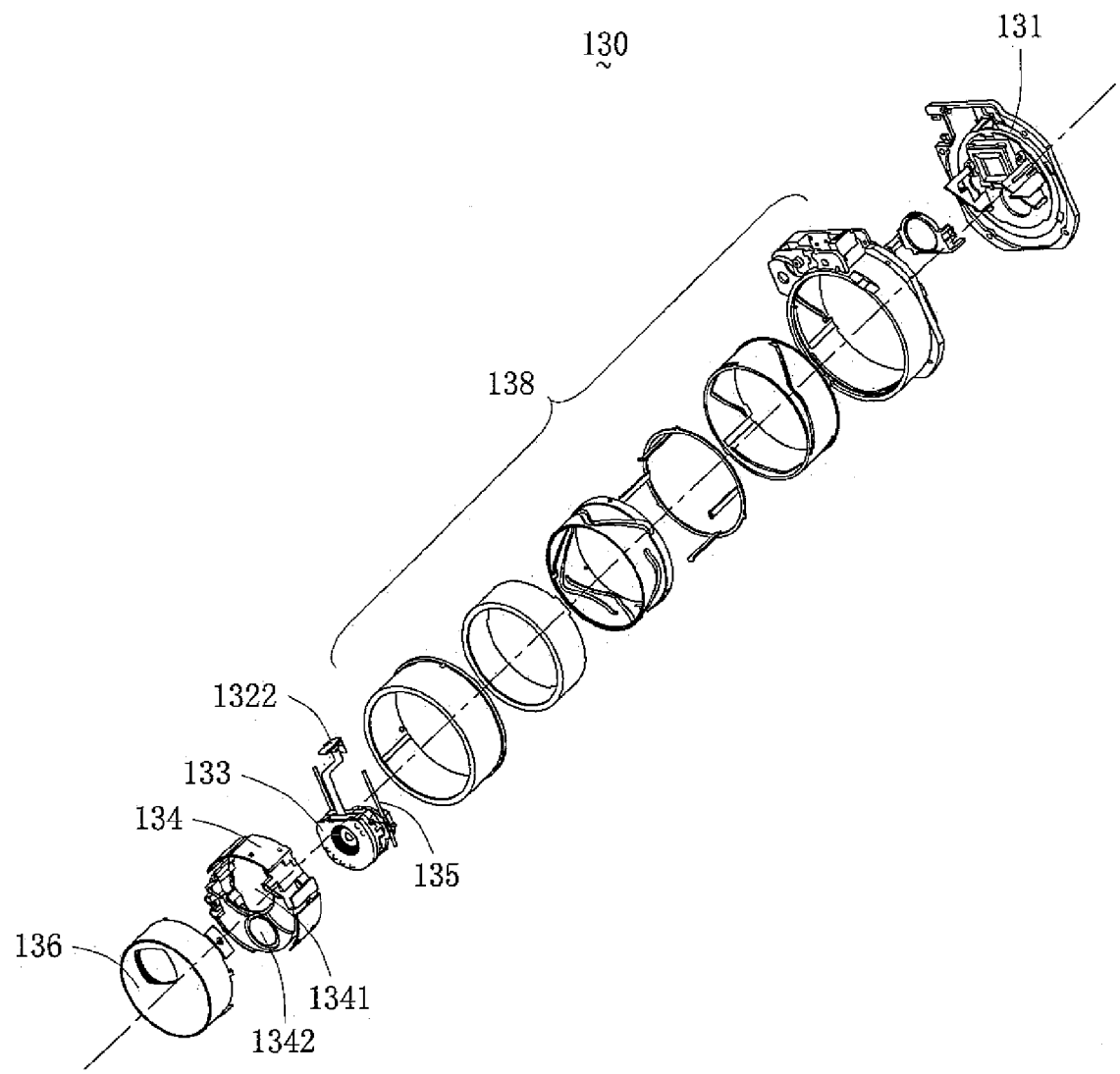
FIG. 4 is an exploded view of a lens retraction mechanism of a second lens group of the zoom lens in accordance with the present invention.

Referring to FIG. 4, the lens retraction mechanism 130 of the second lens group 12 comprises a base body 131, a lens holding frame 132 for holding the second lens group 12, a shutter 133 assembled to the lens holding frame 132, a lens guiding frame 134 which is movable towards or away from the base body 131 along the optical axis Z1, a guiding shaft 135 connecting with the lens holding frame 132 and the lens guiding frame 134, a cap 136 for protecting the second lens group 112, and a connecting assembly 138 for connecting the lens holding frame 132, the lens guiding frame 134 and the base body 131.

Figure 5:
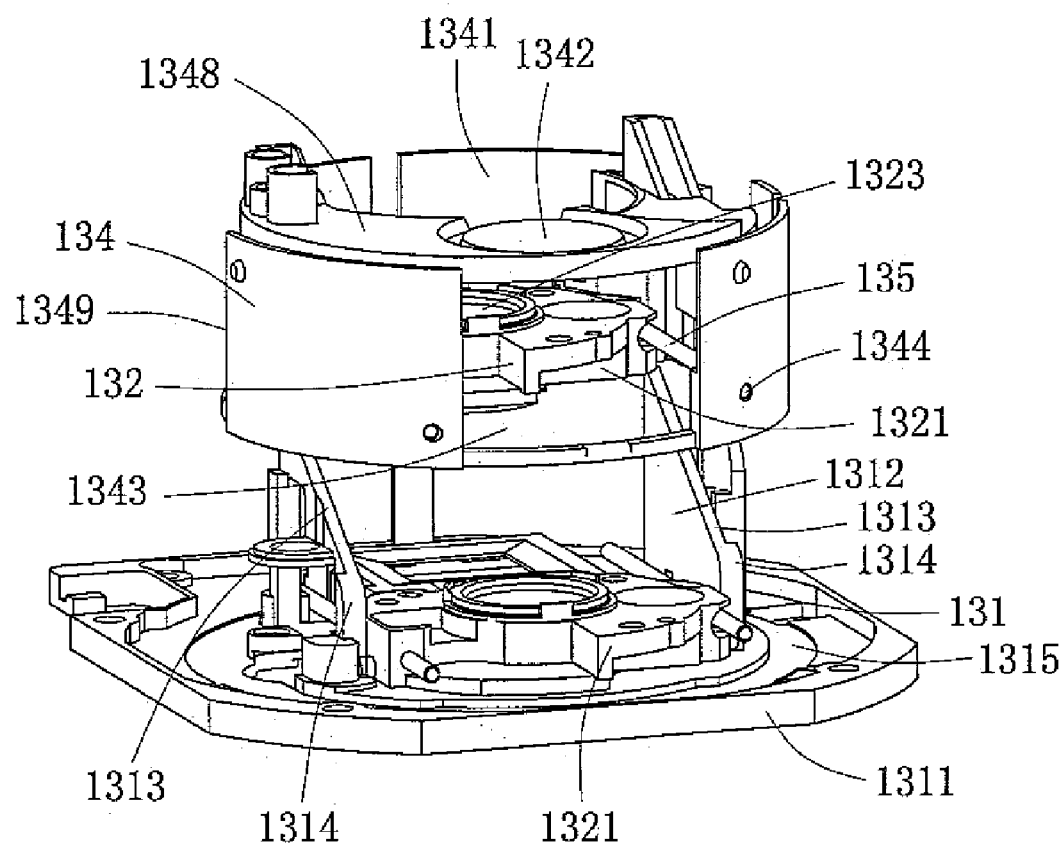
FIG. 5 is a simplified perspective view of the lens retraction mechanism of the second lens group of the zoom lens in accordance with the present invention.

Referring to FIG. 5, the lens retraction mechanism 130 of the second lens group 112 is shown with the main components. The base body 131 comprises a substrate 1311 arranged perpendicular to the optical axis for fixing the image component 120 and a pair of guiding walls 1312 disposed on and perpendicular to the substrate 1311. A receiving space 1315 is defined in an upper surface of the substrate 1311 for receiving the lens holding frame 132. Each guiding wall 1312 has a slant track 1313 whose both ends have different heights relative to a bottom surface of the substrate 1311, and a perpendicular track 1314 connecting the lowest end of the slant track 1313 and the bottom surface of the receiving space.

Figure 7:
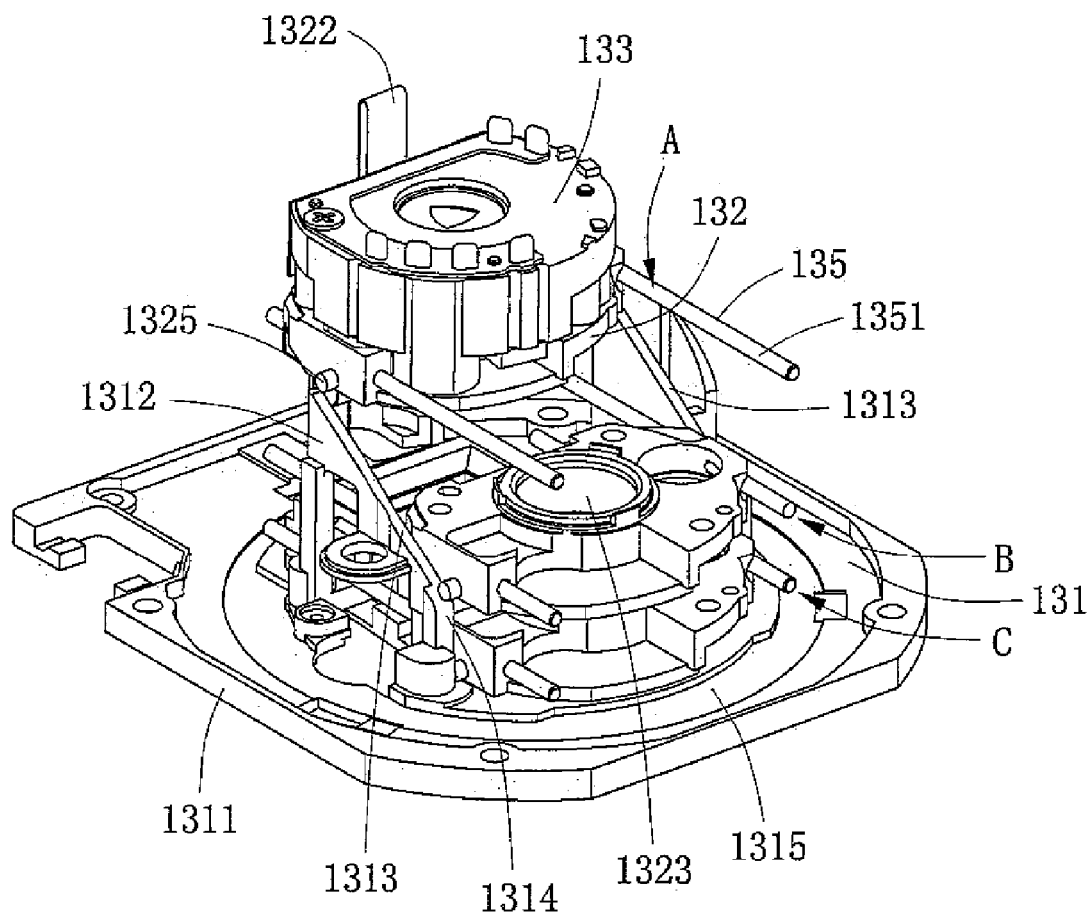
FIG. 7 is a schematic view similar to FIG. 6, showing the retracting process from a shooting position to a receiving space of the zoom lens in accordance with the present invention from another aspect of view.

Referring to FIGS. 4 and 7, the lens holding frame 132 comprises a body portion 1321 and a hook portion 1322 extending from the body portion 1321. A receiving cavity 1323 is defined in the body portion 1321 for receiving the second lens group 112. When the zoom lens is in the shooting state, the receiving cavity 1323 aligns the image component 120. The body portion 1321 defines a pair of grooves 1324 on both sides thereof for receiving the pair of guiding shafts 135, respectively. The grooves 1324 are parallel to the substrate 1311. A pair of slippage portions 1325 is respectively extended from flanges of both sides of the lens holding frame 132, which are able to lean against the slant track 1313. A pair of springs (not shown) is disposed under the lens holding frame 132 and adjacent to the respective slippage portions 1325, which are used for providing elasticity in the direction of the optical axis.

The lens guiding frame 134 has a top wall 1348 and a annular side wall 1349. The top wall 1348 defines therein a first light through hole 1341 corresponding to the shooting-stated second lens group 112 and a second light through hole 1342 corresponding to the retracted-stated second lens group 112. The annular side wall 1349 defines an opening 1343 and a pair of fixing holes 1344 arranged adjacent to the opening 1343 for fixing a first end 1351 of the guiding shafts 135 to the lens guiding frame 134. The guiding shafts 135 each is extended along a shaft axis, which is parallel to the substrate 1311.

Figure 6:
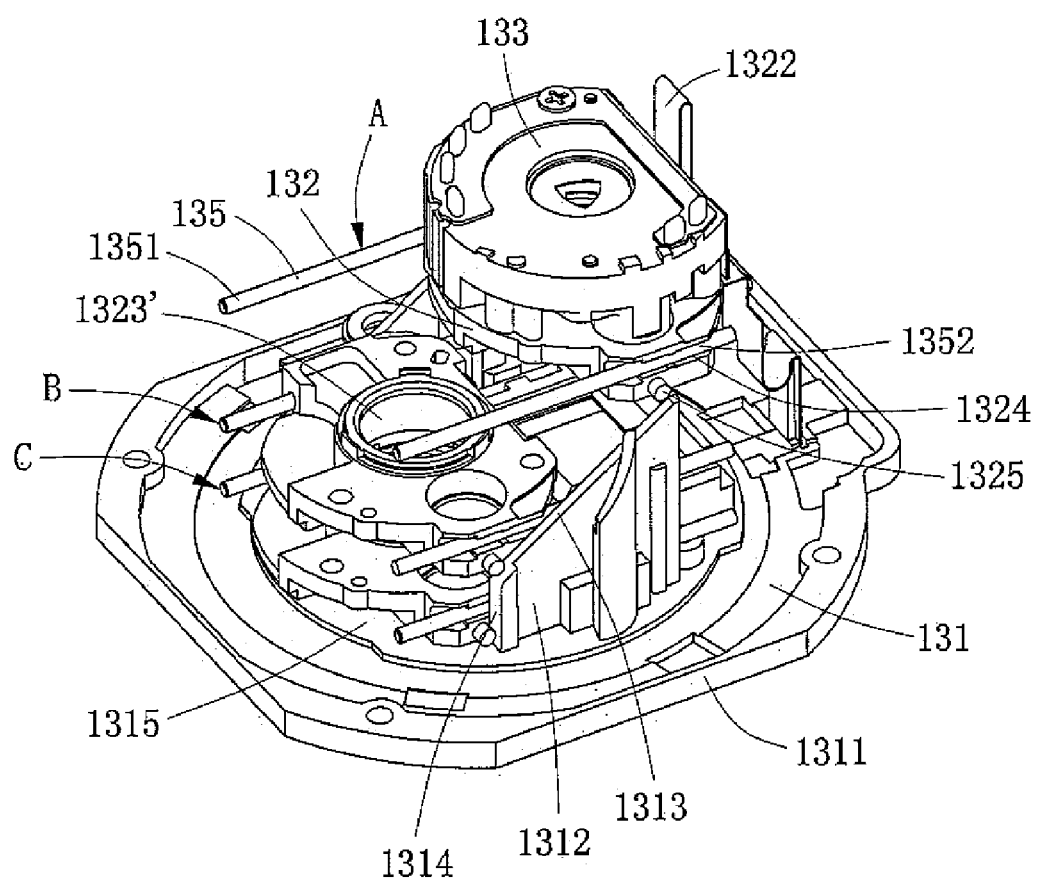
FIG. 6 is a schematic view showing a retracting process from a shooting position to a receiving space of the zoom lens in accordance with the present invention, which mainly indicates positions A, B and C of a lens guiding frame during the retracting process.

FIG. 5 generally illustrates connection between the lens holding frame 132 and the lens guiding frame 134. FIGS. 6 and 7 illustrate the movement of the lens holding frame 132 and the guiding shaft 135 towards the substrate 1311. In the embodiment illustrated, the shutter 133 is separated from the lens holding frame 132 so that it is immovable when the lens holding frame 132 moves. In other embodiments, the shutter 133 can be fixed to the lens holding frame 132 to move together with the lens holding frame 132.

When the zoom lens 10 is in the shooting state as shown in FIG. 2, the lens holding frame 132 and the guiding shaft 135 are located in an "A" position as shown in FIGS. 6 and 7. When they are is the position, the slippage portion 1325 leans against a highest end of the slant track 1313, which has the furthest distance from the substrate 1311. The second ends 1352 of the guiding shafts 135 are respectively received in the grooves 1324.

Once the camera is turned off, the zoom lens 10 begins to retract from the shooting state. Referring to FIGS. 5 to 7, a retraction method of the lens retraction mechanism in accordance with the present invention comprises the following steps.

Firstly, the lens guiding frame 134 is driven to move towards the substrate 1311 in a direction parallel to the optical axis Z1, which forces the guiding shafts 135 to move towards the substrate 1311 too. Accordingly, the guiding shafts 135 draw the lens holding frame 132 to move downwardly. Meanwhile, the slippage portions 1325 are drawn to move downwardly and forwardly along the slant stack 1313 of the guiding wall 1312 under a resultant force combined with a downward force given by the lens holding frame 132 and a supporting force given by the slant track 1313. The lens holding frame 132 moves downwardly together with the guiding shafts 135 and also forwardly relative to the guiding shafts 135, which makes the second lens group 12 retreat away from the optical axis Z1. Then the slippage portions 1325 continuously to move to a lowest end of the slant track 1313 as shown in a B position. During this time, the lens holding frame 132 moves from adjacent to the second ends 1352 to adjacent to the first ends 1351 of the guiding shafts 135. Then, the lens holding frame 132 is driven to move downwardly the with the direction of the lens guiding frame 134, while the slippage portions 1325 glide along the perpendicular track 1314 of the guiding wall 1312. During this time, the lens holding frame 132 doesn't move relative to the guiding shafts 135. Finally, the lens guiding frame 134 and the lens holding frame 132 fall into the receiving space 1315 of the substrate 1311, as indicated by a C position. During the time when the lens holding frame 132 moves from the B position to the C position, the springs connected with the lens holding frame 132 are compressed between the lens holding frame 132 and the substrate 1311.

When the zoom lens 10 is zoomed to protrude from the retraction state to the shooting state, the springs firstly provide the lens holding frame 132 with a bounce force. Then the lens holding frame 132 is driven to move upwardly and backwardly towards the optical axis Z1 by the lens guiding frame 134, until a center of the second lens group 12 is located on the optical axis Z1. The extending process of the zoom lens 100 is reversed to the retraction process thereof.

The retraction method of the lens retraction mechanism according to the present invention is to provide a guiding device (including the slant track 1313, the perpendicular track 1314 and the guiding shafts 135) for guiding the lens holding frame 132 to slide into the receiving space 1315. Particularly, the slippage portions 1325 slide along the guiding track, and the lens holding frame 132 slides relative to the guiding shafts 135. Accordingly, the retraction method simplifies the structure of the lens retraction mechanism of the second lens group 12 and ensures the retraction stable and secure. The retraction method according to the present invention can also be used to retract the other lens groups, such as the first lens group 11 and the third lens group 13, in the zoom lens 10, besides the second lens group 12.

In other embodiments, the shutter 133 can be retracted together with the lens holding frame 132 so as to make the retracted zoom lens thinner It is to be understood, however, that even though numerous characteristics and advantages of the present invention have been set forth in the foregoing description, together with details of the structure and function of the invention, the disclosure is illustrative only, and changes may be made in detail within the principles of the invention to the full extent indicated by the broad general meaning of the terms in which the appended claims are expressed.

What is claimed is:

1. A lens retraction mechanism for retracting a lens group from a shooting position to a receiving space, comprising:
    a base body providing a first guiding device and said receiving space;
    a lens guiding frame moveable with respect to the base body in a direction of optical axis;
    a second guiding device fixed to the lens guiding frame; and
    a lens holding frame for fixing the lens group and slideably connected with the second guiding device, the lens holding frame comprising at least a slippage portion slideable along the first guiding device.

2. The lens retraction mechanism as claimed in claim 1, wherein the base body comprises a substrate disposed perpendicular to the optical axis and at least a guiding wall disposed perpendicular to the substrate.

3. The lens retraction mechanism as claimed in claim 2, wherein the first guiding device is formed on the guiding wall and comprises a slant track having highest and lowest distal ends that are distant from the substrate with different distances.

4. The lens retraction mechanism as claimed in claim 3, wherein the first guiding device comprises a perpendicular track perpendicular to the substrate and connected with the slant track and the substrate.

5. The lens retraction mechanism as claimed in claim 4, wherein the second guiding device comprises at least a guiding shaft extending in a direction perpendicular to the optical axis.

6. The lens retraction mechanism as claimed in claim 5 wherein the lens holding frame defines at least a groove in a side wall thereof for receiving the guiding shaft.

7. The lens retraction mechanism as claimed in claim 6, wherein the slippage portion protrudes from the side wall of the lens holding frame, and the lens holding frame moves with respect to the guiding shaft when the slippage portion moves along the slant track, and the lens holding frame is fixed with respect to the guiding shaft when the slippage portion moves along the perpendicular track.

8. The lens retraction mechanism as claimed in claim 5, wherein an image component is located in the base body and on the optical axis.

9. The lens retraction mechanism as claimed in claim 8, wherein the lens guiding frame comprises a top wall, the top wall defining a first light through hole corresponding to the image component.

10. The lens retraction mechanism as claimed in claim 8, wherein the lens guiding frame comprises an annular side wall, the annular side wall defining at least a hole for receiving the guiding shaft.

11. The lens retraction mechanism as claimed in claim 8, wherein the lens holding frame is assembled with a spring at the bottom thereof.

12. A lens retraction mechanism, comprising:
    a base body;
    a lens guiding frame moveable to the base body;
    a lens holding frame assembled to the lens guiding frame for fixing a lens group; and a guiding device disposed between the base body and the lens guiding frame for guiding the lens group to slantways slide away from an optical axis of the lens group.

13. The lens retraction mechanism as claimed in claim 12, wherein the guiding device comprises a guiding track arranged on the base body and angled to the optical axis of the lens group.

14. The lens retraction mechanism as claimed in claim 13, wherein the guiding device is a slant track.

15. The lens retraction mechanism as claimed in claim 14, wherein the lens holding frame comprises at least a slippage portion slideable along the slant track.

16. The lens retraction mechanism as claimed in claim 13, wherein the guiding device comprises at least a guiding shaft connecting with the lens holding frame and the lens guiding frame.

17. The lens retraction mechanism as claimed in claim 16, wherein the guiding shaft is perpendicular to the optical axis.

18. A method for retracting a lens group by a lens retraction mechanism, the lens retraction mechanism comprising a base body, a lens guiding frame; a guiding device disposed between the base body and the lens guiding frame, and a lens holding frame connecting with the lens guiding frame for fixing the lens group, the method comprising the following steps:
moving the lens guiding frame towards the base body along an optical axis of the lens group; and
moving the lens holding frame towards the base body and away from the optical axis along a guiding track provided by the guiding device with driving by the lens guiding frame.

19. The method as claimed in claim 18, wherein the lens retraction mechanism comprises a guiding shaft connected between the lens guiding frame and the lens holding frame, and the guiding shaft is driven by the lens guiding frame to move towards the base body along the optical axis.

20. The method as claimed in claim 19, wherein the lens holding frame slides along the guiding track with a combined action of the guiding device and the guiding shaft.

21. The method as claimed in claim 20, wherein the lens holding fame slides along the guide track and meanwhile along the guiding shaft, and finally falls into a receiving space defined in the base body.

22. The method as claimed in claim 19, wherein the guiding device comprises a perpendicular track parallel to the optical axis and a slant track angled to the optical axis, the lens holding frame has at least a slippage portion sliding first along the slant track and then along the perpendicular track.

23. The method as claimed in claim 22, wherein the lens holding frame moves relative to the guiding shaft when the slippage portion slides along the slant track, and the lens holding frame is always synchronous with the guiding shaft when the slippage portion slides along the perpendicular track.

* * * * *